United States Patent [19]

Buding et al.

[11] Patent Number: 4,829,128

[45] Date of Patent: May 9, 1989

[54] LOW MOLECULAR WEIGHT COPOLYMERS AND COVULCANIZATES PRODUCED THEREFROM

[75] Inventors: Hartmuth Buding, Dormagen; Zsolt Szentivanyi, Leverkusen; Joachim Thörmer, Leverkusen, all of Fed. Rep. of Germany

[73] Assignee: Bayer Aktiengesellschaft, Leverkusen, Fed. Rep. of Germany

[21] Appl. No.: 922,947

[22] Filed: Oct. 24, 1986

Related U.S. Application Data

[62] Division of Ser. No. 770,103, Aug. 28, 1985, Pat. No. 4,647,627.

[30] Foreign Application Priority Data

Sep. 8, 1984 [DE] Fed. Rep. of Germany ....... 3433075

[51] Int. Cl.$^4$ .................................................. C08F 8/04
[52] U.S. Cl. .................................. 525/329.6; 525/338; 525/339
[58] Field of Search ...................... 525/338, 339, 329.6

[56] References Cited

U.S. PATENT DOCUMENTS

3,629,172 12/1971 Jones .
3,700,637 10/1972 Finch .
4,581,417 4/1986 Buding .

FOREIGN PATENT DOCUMENTS

3229871 2/1983 Fed. Rep. of Germany .
1176572 4/1959 France .

*Primary Examiner*—Jacob Ziegler
*Attorney, Agent, or Firm*—Connolly & Hutz

[57] ABSTRACT

Statistical copolymers of from 85 to 52% by weight of a conjugated diene, from 15 to 48% by weight of at least one unsaturated nitrile and from 0 to 10% by weight of further monomers, copolymerizable with diene and nitrile, which have a molecular weight $M_n$ of from 0.5 to 30 kg/mol and a degree of hydrogenation of the double bonds of greater than 80%, give nitrile rubbers, which are mixed and colvulcanized with these copolymers, an increased ozone resistance.

2 Claims, No Drawings

LOW MOLECULAR WEIGHT COPOLYMERS AND COVULCANIZATES PRODUCED THEREFROM

This is a division of copending application Ser. No. 770,103 filed Aug. 28, 1985, now U.S. Pat. No. 4,647,627.

This invention relates to low molecular weight, partially or completely hydrogenated copolymers of diene and nitrile monomers, and covulcanisates produced therefrom by cross-linking together with nitrile group-containing elastomers.

Fluid (low molecular weight), statistically formed copolymers of diene and vinyl monomers, produced by emulsion or solution polymerisation, are known, for example, from US-PS No. 2 469 132, 3 099 650 and 3 551 472. These copolymers contain double bonds corresponding to their diene content.

It has now been found that partial or complete hydrogenation of these double bonds leads to products with surprisingly advantageous properties.

This invention thus provides statistical copolymers of from 85 to 52% by weight, preferably from 82 to 66% by weight, of at least one conjugated diene, from 15 to 48% by weight, preferably from 18 to 34% by weight, of at least one unsaturated nitrile, and from 0 to 10% by weight of at least one further monomer which is copolymerisable with diene and unsaturated nitrile, and which have an average molecular weight (number average) of from 0.5 to 30 kg/mol, preferably from 0.8 to 5.0 kg/mol, and a degree of hydrogenation of the double bonds of greater than 80%, preferably greater than 95%, most preferably greater than 99%.

The hydrogenation of unsaturated rubbers is generally known and described, for example, in US-PS No. 3 700 637, DE-OS No. 2 539 132, DE-OS No. 2 913 992 and DE-OS No. 3 046 008. According to these methods, the CN triple bonds of the nitrile groups remain unchanged.

Isoprene, 2,3-dimethyl butadiene, 1,3-pentadiene and preferably 1,3-butadiene are used, for example, as conjugated dienes, and methacrylonitrile and preferably acrylonitrile, for example, as nitrile monomers. Further suitable monomers are, for example, acrylic acid, methacrylic acid, fumaric acid, maleic acid and itaconic acid and the monoesters thereof or, as far as possible, the diesters. Methacrylic acid is preferred.

A binary polymer of butadiene and acrylonitrile is most preferably used.

The polymers according to the invention have the surprising property, when mixed with nitrile rubbers and covulcanized with these, of substantially increasing the ozone resistance of these nitrile rubbers.

The invention therefore also provides mixtures and covulcanizates produced therefrom by cross-linking, consisting of from 90 to 55% by weight, preferably from 70 to 60% by weight, of butadiene-acrylonitrile-copolymers with acrylonitrile contents of from 18 to 49% by weight and a minimum Mooney viscosity ML 1+4/100° C. of 25 Mooney units, and from 10 to 45% by weight, preferably from 30 to 40% by weight, of the aforementioned statistical partially or completely hydrogenated copolymers, and further conventional constituents of rubber mixture, the percentage of the mixture constituents being based on the sum of the two mixture components.

The cross-linking can be carried out both with sulphur or sulphur donors or with peroxides. Suitable compounds are known.

The Mooney viscosity of the butadiene-acrylonitrile-copolymers is preferably from 50 to 100 mooney units. The acrylonitrile content of the butadiene-acrylonitrile-copolymers is preferably from 30 to 45% by weight.

Conventional mixture constituents of a rubber mixture are known to those skilled in the art; these are, for example, fillers, plasticisers, anti-aging agents, processing auxiliaries, pigments, acid acceptors and vulcanisation chemicals, whereby peroxides, sulphur or sulphur donors are used for the vulcanisation of the rubber mixture according to the invention.

From 0.1 to 5, preferably from 0.1 to 1.8% by weight of sulphur, based on polymer, and from 0.2 to 8, preferably from 2 to 4% by weight of sulphur donor, based on rubber solids, are used.

Suitable sulpur donors are, for example, tetraalkylthiuram disulphides, cycloalkylalkylthiuram disulphides, arylalkylthiuram disulphides, tetraalkylthiuram tetrasulphides or morpholinyl dithiobenzothiazole.

Suitable peroxides are, for example, dialkyl peroxides, ketal peroxides, aralkyl peroxides, peroxyethers and peroxyesters.

Di-ter.-butyl peroxide, bis-(tert.-butylperoxyisopropyl)-benzene, dicumyl peroxide, 2,5-dimethyl-2,5-di(tert.-butylperoxy)-hexane, 2,5-dimethyl-2,5-di(tert.-butyl-peroxy)-hexene-(3), 1,1-bis(tert.-butylperoxy)-3,3,5-trimethylcyclohexane, benzoyl peroxide, tert.-butylcumyl peroxide or tert.-butyl perbenzoate are preferably used.

The quantities of peroxides used are from 1 to 15% by weight, preferably from 2 to 5% by weight, based on rubber solids.

The covulcanisates are suitable for all areas of use suitable for nitrile rubber, particularly, however, for those purposes in which an increased ozone resistance is important.

The molecular weights were determined by gel permeation chromatography or by vapour pressure osmometry.

The degrees of hydrogenation represent how great a percentage of the C,C-double bonds originally present in the polymer has been hydrogenated.

The hydrogenation can be carried out with homogeneous or heterogeneous catalysis.

For the homogeneous catalytic hydrogenation, compounds of the formula

$$RhX(L)_3$$

are, for example, used wherein

X represents Cl, Br or I and

L represents a ligand of the group of organophosphorous and organoarsenic compounds.

Triphenyl phosphate is preferably used.

Hydrogenation is effectively carried out in solution with the use as solvent of aromatic hydrocarbons which are optionally chlorinated, for example, benzene, toluene xylene, chlorobenzene, dichlorobenzene and methylchlorobenzene, preferably chlorobenzene.

The concentration of the polymer is the solution is from 1 to 99% by weight, preferably from 5 to 50% by weight.

The hydrogenation is carried out in particular at from 0 to 180° C., preferably at from 20 to 160° C., most preferably at from 100 to 145° C., and under a hydrogen pressure of from 1 to 350 bars, preferably under a hydrogen pressure of from 100 to 250 bars.

The catalyst, calculated as rhodium metal, is used in quantities of from 10 to 700 ppm, preferably from 90 to 250 ppm, based on the polymer.

For the heterogeneous catalytic hydrogenation, palladium precipitated on a carrier, such as carbon black, active carbon or silicone dioxide, is used as catalyst. The remaining conditions may be within the limits given for the homogeneous catalysis, palladium being used in quantities up to 10000 ppm, based on the polymer. Acetone or methylethylketone is preferably used as solvent.

EXAMPLE 1

A carefully degassed solution of 3 kg of a statitical acrylonitrile-butadiene-copolymer, produced by emulsion polymerisation, with an acrylonitrile content of 29% by weight and an average molecular weight (number average) of 1.7 kg/mol (determined by gel permeation chromatography) in 27 kg of chlorobenzene and a carefully degassed solution of 4.5 g of tris-(triphenyl-phosphane) rhodium (I)-chloride in 2 kg of chlorobenzene are placed in a 40 l autoclave rendered inert with nitrogen. The inert gas is replaced by hydrogen and hydrogenation is carried out for 4 hours at 120° C. under 150 bars. The chlorobenzene is removed with a thin layer evaporator under vacuum. The degree of hydrogenation is 99.6% (determined by IR-spectroscopy).

EXAMPLE 2

A solution of 9.1 g of a sulphur-free, statistical acrylonitrile-butadiene-copolymer, produced in toluene with 2,2'-azo-bis-isobutyronitrile at 119° C. by a run-in process, with an acrylonitrile content of 26.7% by weight and an average molecular weight (number average) of 1.4 kg/mol (determined by vapour pressure osmometry) in 365 g of methylethylketone and 1.82 g of catalyst (5% by weight of Pd on carbon) are placed in a 0.7 l autoclave. The autoclave is flushed several times with nitrogen. Hydrogenation is then carried out for 4 hours at 140° C. and under a hydrogen pressure of 100 bars. The catalyst is centrifuged off. The degree of hydrogenation is 97.3% (determined by IR-spectroscopy).

EXAMPLE 3

The following mixtures (parts by weight) are produced in 15 min on a laboratory roller heated to 155° C.

| | Mixtures | |
|---|---|---|
| | A | B |
| Polymer I | 65 | 65 |
| Polymer II | 35 | — |
| Polymer III | — | 35 |
| Vinylsilane | 2.0 | 2.0 |
| Ca—silicate | 50.0 | 50.0 |
| Mg—oxide | 3.0 | 2.0 |
| Zn—oxide | 2.0 | 2.0 |
| Stearic acid | 1.0 | 1.0 |
| Sulphur (80% by weight) | 0.2 | 0.2 |
| Tetramethylthiuram disulphide | 2.0 | 2.0 |
| 2-(4-morpholinyldithio)-benzothiazole | 1.0 | 1.0 |
| Mooney viscosity ML 1 + 4/100° C. (Mooney units) | 34 | 33 |
| Vulcameter $t_{10}$ (min) | 2.6 | 2.1 |
| 180° $t_{90}$ (min) | 7.3 | 5.0 |
| Vulcanisation 180° C., 10 min, standard ring I | | |
| Tensile strength (MPa) | 7.3 | 4.3 |
| Elongation at break (%) | 380 | 650 |
| Hardness 23° C. (Shore A) | 44 | 47 |
| Compression Set 125° C./70 h (%) | 61 | 82 |
| Modulus at 100% elongation (MPa) | 0.8 | 1.0 |
| ozone-aging 50 pphm $O_3$, 20° C., 45% relative humidity start of crack formation at 100% elongation (h) | 24 | 168 |

Polymer I is a butadiene-acrylonitrile-copolymer with an acrylonitrile content of 34% by weight and a Mooney viscosity ML 1+4/100° C. of 65 mooney units.

Polymer II is a butadiene-acrylonitrile-copolymer with an acrylonitrile content of 29% by weight and an average molecular weight (number average) of 1.7 kg/mol.

Polymer III is a hydrogenated butadiene-acrylonitrile copolymer with an acrylonitrile content of 28% by weight, an average molecular weight (number average) of 2.4 kg/mol and a degree of hydrogenation of 99.6%.

We claim:

1. A statistical copolymer consisting of from 85 to 52% by weight of at least one conjugated diene, from 15 to 48% by weight of at least on unsaturated nitrile and up to an additional 10% by weight of at least one further monomer which is copolymerizable with the diene and the unsaturated nitrile selected from the group consisting of acrylic acid, methacrylic acid, fumaric acid, maleic acid, itaconic acid and the mono- and diesters thereof, which has an average molecular weight, number average, of from 0.5 to 30 kg/mol and a degree of hydrogenation of the double bonds of greater than 80%.

2. A statistical copolymer consisting of from 85 to 52% by weight of at least one conjugated diene and from 15 to 48% by weight of at least one unsaturated nitrile, which has an average molecular weight, number average, of from 0.5 to 30 kg/mol and a degree of hydrogenation of the double bonds of greater than 80%.

* * * * *